Patented Jan. 2, 1923.

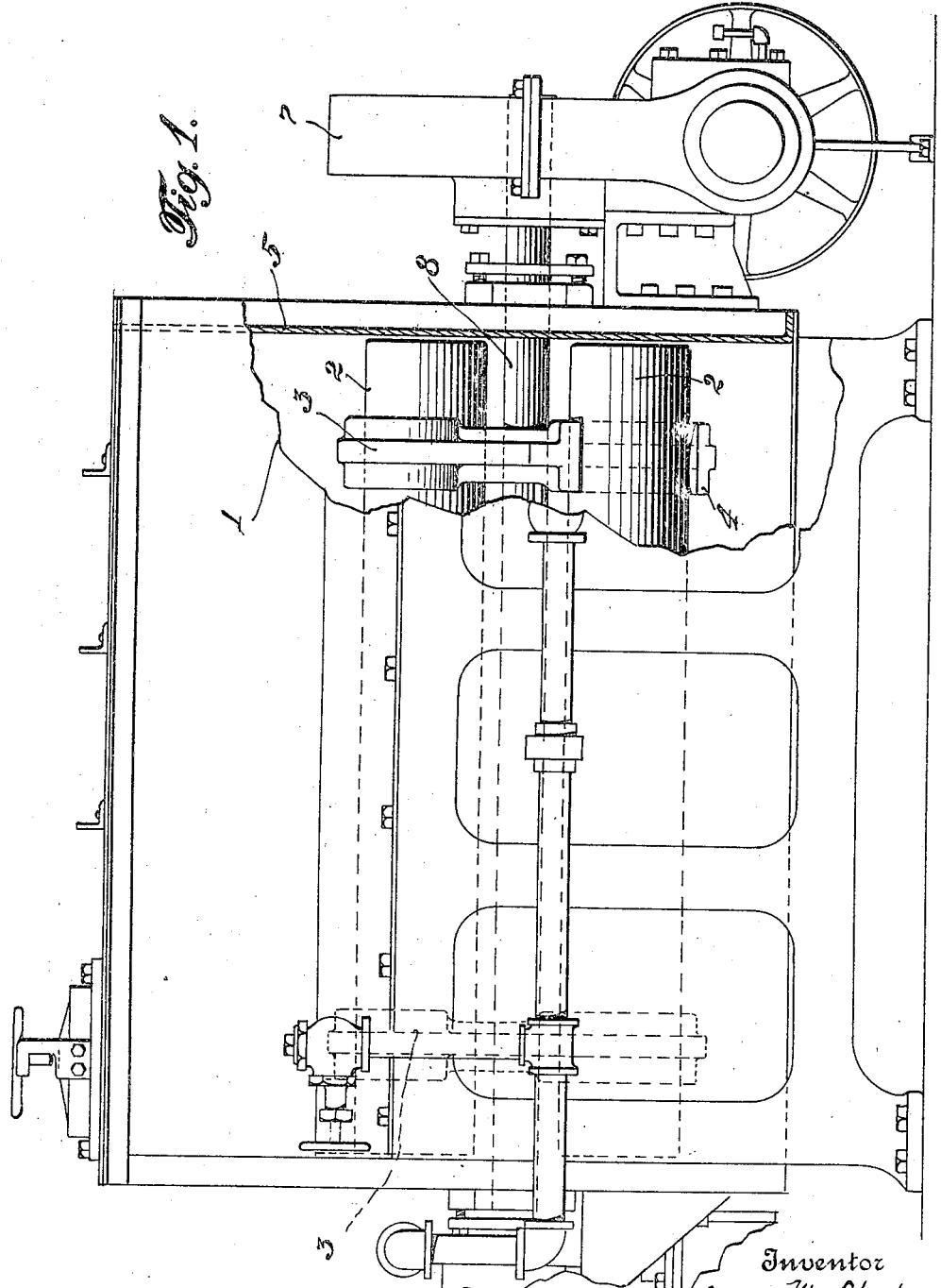

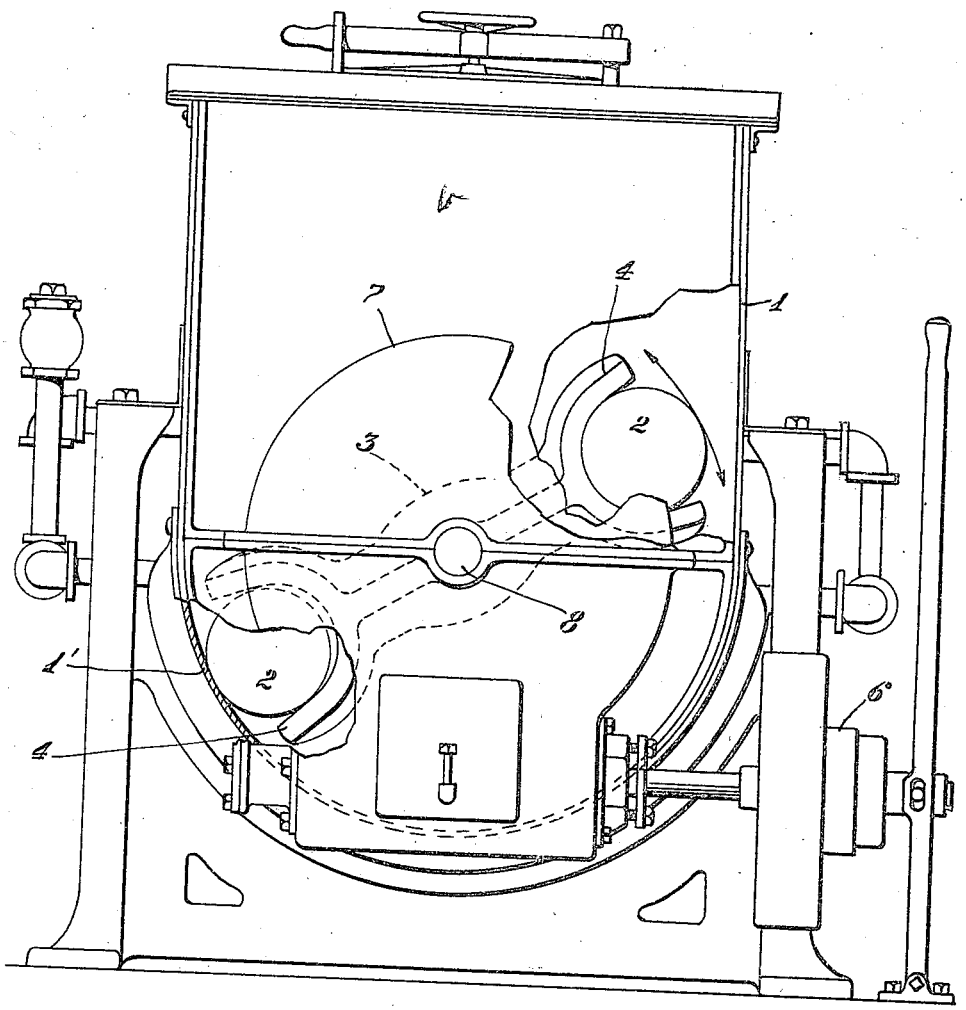

1,440,941

UNITED STATES PATENT OFFICE.

OSCAR M. STOUT, OF BROOKLYN, NEW YORK.

CHOCOLATE-BLENDING MACHINE.

Application filed May 12, 1922. Serial No. 560,373.

*To all whom it may concern:*

Be it known that I, OSCAR M. STOUT, a citizen of the United States, and a resident of Brooklyn, in the county of Kings and State of New York, have invented certain new and useful Improvements in Chocolate-Blending Machines, of which the following is a specification.

My invention relates to machines designed particularly for the mixing and grinding of materials consisting of chocolate and other ingredients.

My invention further is applicable to the mixing and grinding or triturating of other substances.

The object of my invention is to provide a machine of simple and cheap construction and of large output employing as the grinding or triturating element one or more loosely supported rollers carried by mixing arms and adapted to roll, under the action of the arms or shaft carrying them, upon the curvilinear bottom of a mixing tank or container.

The special object of my invention is to provide a machine wherein the supporting arms may act effectively as mixer arms and the triturating rollers may be so supported in said arms as to be in wiping relation at their ends over their whole diameter or area with the ends of the tank.

A further special object of the invention is to so mount or support the rollers on the ends of the arms that they will be in working engagement with the curvilinear surface through a large arc of revolution of the driving arms.

A further object is to provide a simple construction whereby the driving force shall be super-added to the force of gravity in forcing the rollers against the bottom of the tank.

To these ends my invention consists in the construction of mixer more particularly hereinafter described and then pointed out in the claims.

Fig. 1 of the accompanying drawings is a front elevation of a machine embodying my invention, a part of the casing or container being broken away to better illustrate the construction.

Fig. 2 is an end elevation of the same, a part of the end wall being broken away for the same purpose.

1 indicates the mixing tank or container having the curvilinear bottom 1' upon which the grinding or triturating rollers 2 engage and over which they roll for the purpose of triturating, mixing and reducing material to fine or impalpable state. 8 indicates the main operating shaft of the machine. From said shaft extend two or more sets of mixing arms 3 bifurcated at their ends to afford supports 4 in operating or propelling engagement with the rollers 2. For the sake of illustration I have shown two sets of arms 3. These arms and their bifurcated ends rotating in the mixture assist in the mixing operation as the parts rotate by the action of power applied to the main shaft 8. The arms and the bifurcations therefor are located a sufficient distance away from the end walls of the tank and the bifurcations are of sufficient size to permit the rollers 2 to project freely for substantially their whole diameter through the bifurcations and to be located in close or wiping relation with the end walls 5 over the whole or maximum diameter of the roll.

As will be seen, no special construction of bearing or pintle is necessary for the rollers which may be of a uniform diameter for their whole length and, as will be seen, will roll against the whole curvilinear bottom for the whole length thereof and thereby grind or triturate substantially all the material in the bottom of the tank. Furthermore, their ends being in wiping engagement or relation to the ends of the tank, will serve to wipe away any of the material that may tend to lodge upon said end walls and carry it over into the mixture and into position for the triturating or grinding operation of the rollers.

The bifurcations 4 permit the rollers to drop or move by gravity against the curvilinear bottom and, as the arms rotate, the bifurcations pick up the rollers and carry them around for resumption of the operation.

In order to increase the arc of rotation during which the rollers effectively engage the bottom of the tank as well as to cause the driving force to be super-added to the force of gravity in forcing the rollers during the operation against the bottom of the tank, I form said bifurcated ends with diverging engaging surfaces where they engage or support the rollers so that, during rotation, the roller will be free to roll out of the support at an earlier point in its downward movement of translation and so that, further, the propulsive effect applied to the roller through the operation of the shaft 8 will tend to force it outward against the bottom or wall of the tank and thereby increase the power realizable in a triturating or grinding action.

As will be seen, in this operation the roller will pass or roll from the forward arm of the bifurcation by gravity but the rearward arm or the arm which is the upper arm, as shown in Fig. 2, being also inclined, will in the action of forcing the roller around, tend also to force it positively against the bottom of the tank.

A proper opening in the top of the tank permits it to be charged with materials to be mixed and ground or triturated and a suitable gate or valve in the end thereof allows withdrawal of the mixture.

The rotation of the shaft 8 may be under power transmitted from pulley 6 through a suitable gear contained in the gear casing 7 or by other means.

As will be seen, the arms supporting the rollers being located away from the ends of the tank, may act effectively as mixer arms since there is no tendency to clogging of the material between the end walls and arms as would be the case if the arms were arranged close to the walls with the ends of the rollers terminating in them.

What I claim as my invention is:—

1. In a mixing and grinding or triturating machine, the combination of a tank having a curvilinear bottom, a longitudinal shaft extending therethrough, mixer arms projecting from said shaft provided at their ends with bifurcations and grinding or triturating rollers freely supported in said bifurcations and extending freely therethrough for their whole diameter and into wiping relation with the ends of the tank.

2. In a mixing and grinding or triturating machine, the combination of a tank having a curvilinear bottom, a longitudinal shaft extending therethrough, arms projecting from said shaft and provided at their ends with bifurcations and rollers freely supported in and projecting through said bifurcations, said bifurcations being provided near their extremities with roller engaging surfaces diverging in the portions thereof through which the propulsive effect is applied by the operation of the driving shaft, as and for the purpose described.

3. In a mixing and grinding or triturating machine, the combination of a tank having a curvilinear bottom, a longitudinal shaft provided with a plurality of sets of mixer arms and triturating rollers freely supported in bifurcations in the ends of said arms having diverging engaging surfaces contacting with the rollers and supporting the same by their whole circumference with their ends extending into wiping relation with the ends of the tank.

Signed at New York, in the county of New York and State of New York, this 11th day of May, A. D. 1922.

OSCAR M. STOUT.

Witnesses:
W. R. WARNER,
F. B. TOWNSEND.